(12) United States Patent  
Christianson et al.

(10) Patent No.: US 7,040,666 B2  
(45) Date of Patent: May 9, 2006

(54) FULL PORT EXTERNALLY GIMBALLED JOINT

(75) Inventors: Eric Jon Christianson, Lebanon, OH (US); John Samuel Hill, Dayton, OH (US); Anthony Fredric Damele, Middletown, OH (US)

(73) Assignee: General Electric Company, Schenectady, NY (US)

( * ) Notice: Subject to any disclaimer, the term of this patent is extended or adjusted under 35 U.S.C. 154(b) by 196 days.

(21) Appl. No.: 10/456,867

(22) Filed: Jun. 6, 2003

(65) Prior Publication Data

US 2004/0245770 A1    Dec. 9, 2004

(51) Int. Cl.  
*F16L 27/04*    (2006.01)

(52) U.S. Cl. .................. 285/265; 285/145.5; 285/264; 285/226

(58) Field of Classification Search .............. 285/264, 285/265, 226, 145.5  
See application file for complete search history.

(56) References Cited

U.S. PATENT DOCUMENTS

| | | | | |
|---|---|---|---|---|
| 3,219,365 A | * | 11/1965 | Webb | ......................... 285/45 |
| 3,663,044 A | * | 5/1972 | Contreras et al. | ........... 285/226 |
| 3,915,482 A | * | 10/1975 | Fletcher et al. | ............. 285/226 |
| 4,165,107 A | * | 8/1979 | Affa et al. | ..................... 285/41 |
| 4,480,857 A | * | 11/1984 | Graves | ........................ 285/45 |
| 4,643,463 A | | 2/1987 | Halling et al. | |
| 4,645,244 A | | 2/1987 | Curtis | |
| 5,280,968 A | | 1/1994 | Moore et al. | |
| 5,286,071 A | * | 2/1994 | Storage | ....................... 285/226 |

\* cited by examiner

*Primary Examiner*—James M. Hewitt  
(74) *Attorney, Agent, or Firm*—William Scott Andes; Steven J. Rosen

(57) ABSTRACT

A gimballed joint includes an annular bellows seal circumscribed about a joint centerline mounted within forward and aft shrouds having clevises with lugs and a threaded hole disposed through each of lugs. A ring circumscribed about the lugs has counterbored holes. Each of the counterbored holes is aligned with one of the threaded holes. Pins having heads and shanks extending inwardly therefrom are disposed through and the heads engage the counterbored holes. Externally threaded portions of the shanks are threaded into internally threaded holes in the each of the lugs. A key is disposed through a key hole extending inwardly through each of the heads and through threaded together portions of external threads of each of the externally threaded portions and internal threads of each of the internally threaded holes. In one embodiment wear bushings are disposed in the counterbored holes between the heads and the ring.

59 Claims, 8 Drawing Sheets

FULL PORT EXTERNALLY GIMBALLED JOINT

BACKGROUND OF THE INVENTION

1. Field of the Invention

This invention relates to joint assemblies for ducting and, more particularly, gimbal joints used to flexibly connect sections of ducting and, more particularly, high pressure aircraft ducting together so that the sections of ducting can swivel at the joints relative to each other.

2. Description of Related Art

Gas turbine engines produce very high pressure air which is ducted for use in various parts of the engine and/or other external applications such as in an aircraft. The high pressure ducting must often have flexible joints to accommodate the irregular internal passages of various aircraft and other hardware and machinery in which the ducting is used. To meet this requirement, sections of ducting are often connected by gimbal joints which provide the necessary flexibility during installation and operation of the ducting during engine operation. Such joints also allow the ducting limited freedom of movement when the ducting is subject to operational stresses when the engine is operating, particularly in aircraft. High temperatures and fluctuations in pressure can cause stress on the ducting and joints. Gimbal joints allow the ducting to rotate to accommodate the stresses.

Gimbal joints to accommodate high temperature high pressure flows have been developed but they have narrow areas in the middle of the joints which restricts flow and causes flow losses in the ducts. It is desirable to have a gimbal joint for high temperature high pressure flows that is light weight, compact, and strong. It is desirable to have a gimbal joint that is easy to assemble and disassemble for repair purposes. Previous designs have experienced bending of clevis lugs which have holes through which gimballing pins are disposed. Some of the bending has been so pronounced, that not only did the bending limit the amount of rotation the joint could accommodate, but pins also fell out. It is also desirable to have a very tight seal between a bellows of the seal and the forward and aft shrouds of the joint.

BRIEF DESCRIPTION OF THE INVENTION

A gimballed joint includes an annular bellows seal circumscribed about a joint centerline mounted radially within forward and aft shrouds. The forward and aft shrouds have clevises with lugs and threaded holes disposed through the lugs. A ring surrounds or is circumscribed about the lugs. Pins having heads and shanks extending inwardly therefrom secure the ring to the lugs. Externally threaded portions of the shanks are threaded into the internally threaded holes in the each of the first and second forward lugs and the first and second aft lugs.

The ring has counterbored holes and each of the counterbored holes has a wide radially outer section and a narrow radially inner section and is aligned with one of the threaded holes. Each of the pin heads includes a relatively wide outer section disposed in each corresponding wide radially outer section of the four counterbored holes and a relatively narrow inner section disposed in each corresponding narrow radially inner section of the four counterbored holes. A key is disposed through a key hole extending inwardly through each of the heads and through threaded together portions of external threads of each of the externally threaded portions of the pins and internal threads of each the internally threaded holes.

In one exemplary embodiment of the gimballed joint, the key is disposed at an angle to a pin centerline normal to the joint centerline and through each of the heads and the threaded together portions. Another exemplary embodiment of the gimballed joint includes a wear bushing pressed onto each pin shank, and disposed in each of the four counterbored holes between each of the heads and the ring.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
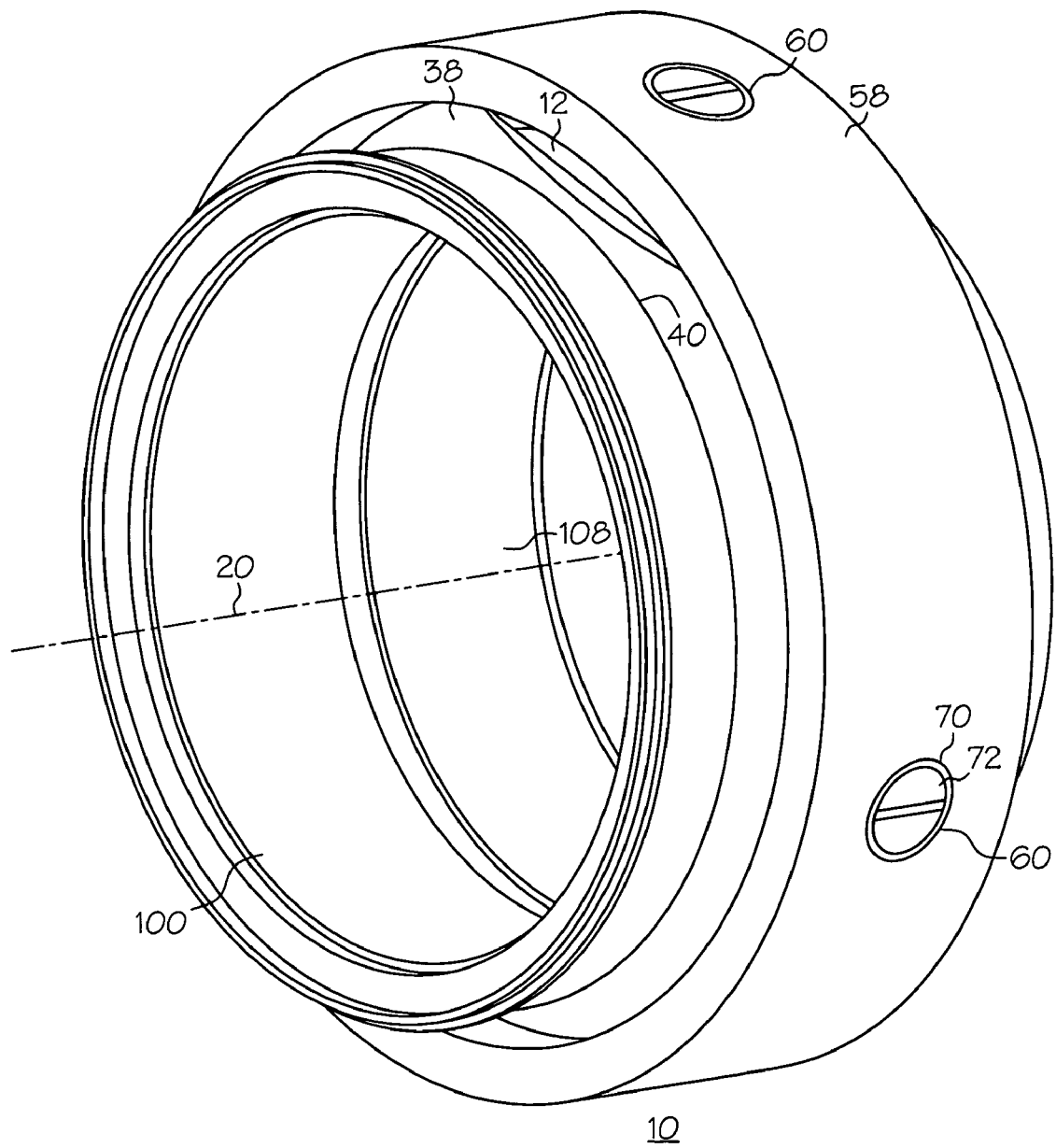
FIG. 1 is a perspective view illustration of a full port externally gimballed joint.
Figure 3:
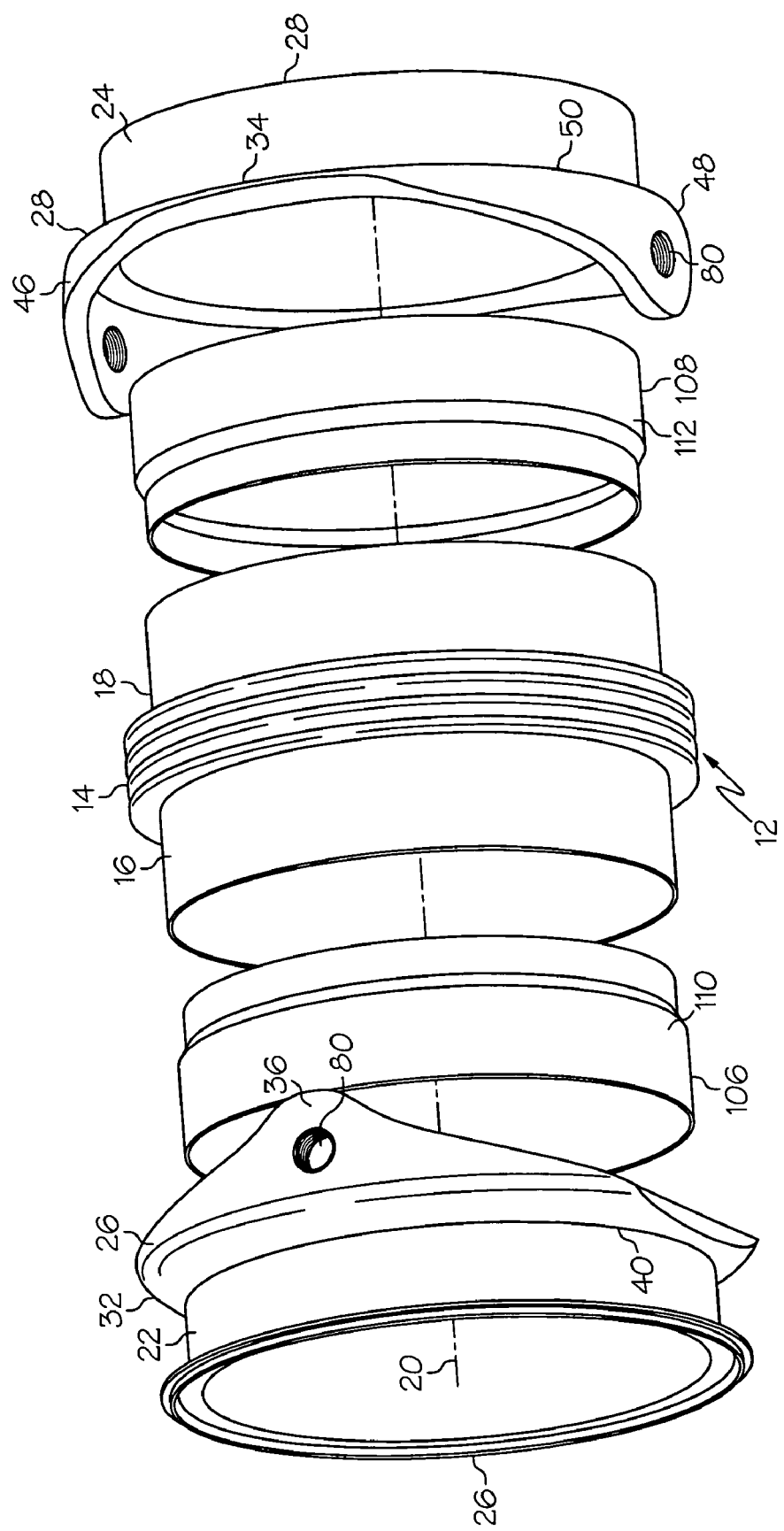
FIG. 3 is an exploded view illustration of a bellows seal, forward and aft shrouds, and forward and aft liners of the gimballed joint illustrated in FIG. 1.

Illustrated in FIGS. 1 and 3 is gimballed joint 10 including an annular bellows seal 12 having a middle section bellows 14 between forward and aft cylindrical seal sections 16 and 18 circumscribed about a joint centerline 20. The forward and aft cylindrical seal sections 16 and 18 are mounted within and to forward and aft shroud annular sections 22 and 24, respectively, of forward and aft shrouds 26 and 28. The forward and aft shrouds 26 and 28 have forward and aft clevises 32 and 34, respectively. The forward and aft clevises 32 and 34 are spaced 90 degrees apart from each other. The forward clevis 32 has first and second forward lugs 36 and 38 spaced 180 degrees apart around a forward periphery 40 of the forward shroud annular section 22. The aft clevis 34 has first and second aft lugs 46 and 48 spaced 180 degrees apart around an aft periphery 50 of the aft shroud annular section 24.

Figure 5:
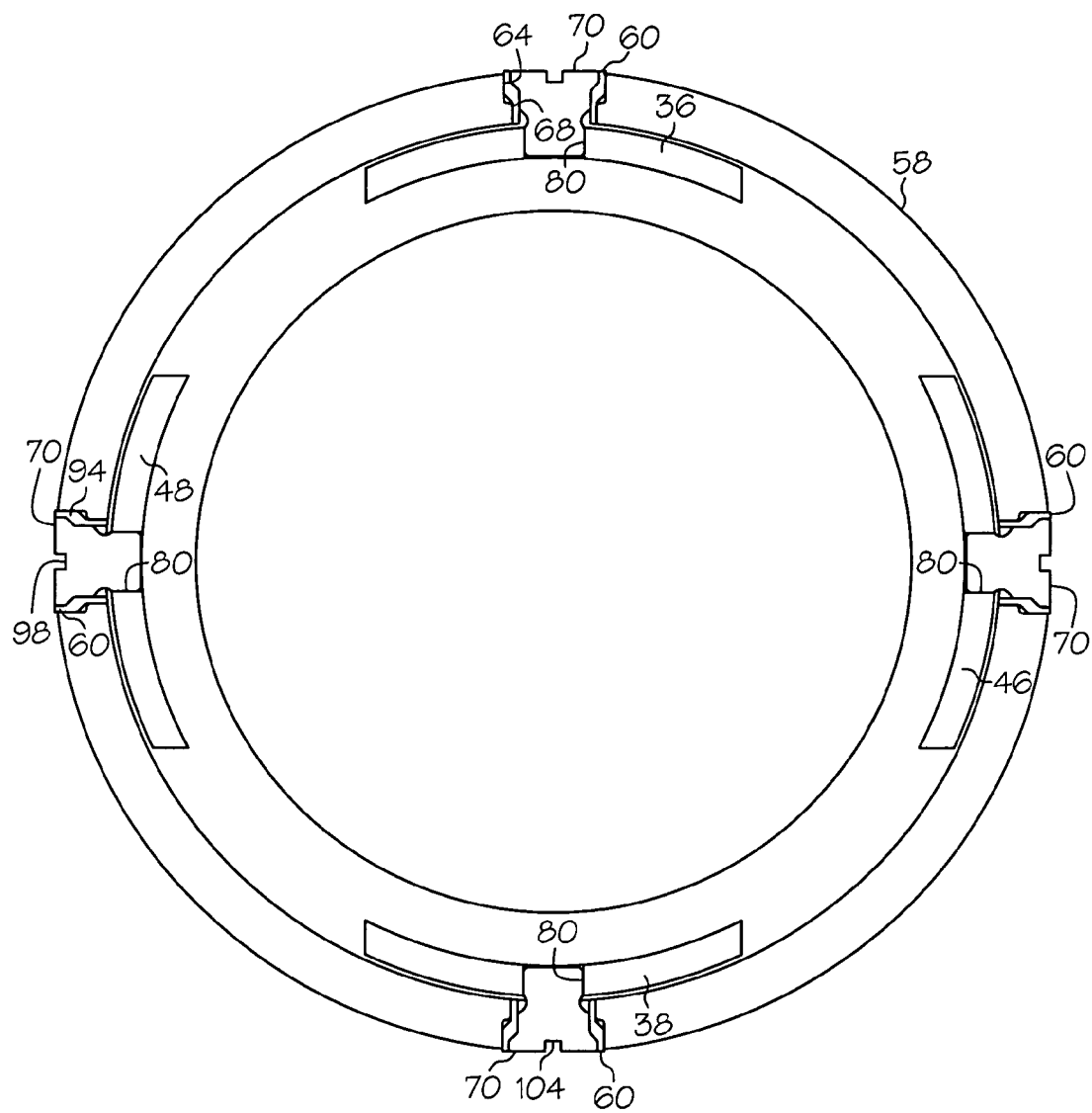
FIG. 5 is a cross-sectional view illustration of the gimballed joint illustrated in FIG. 1 taken along an axis and through the pins of the gimballed joint.
Figure 6:
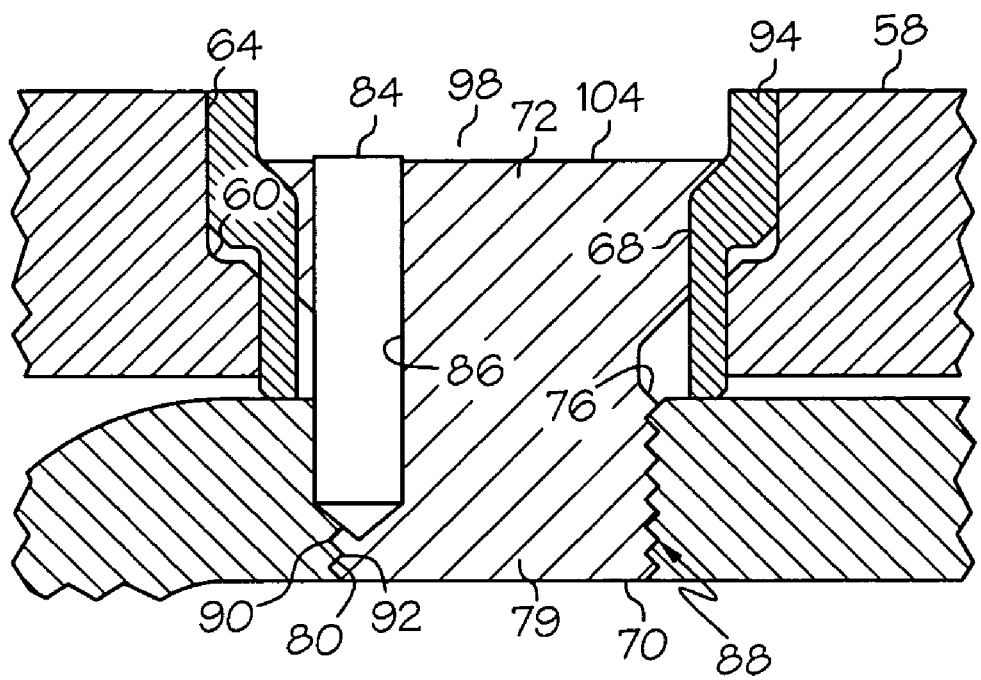
FIG. 6 is a cross-sectional view illustration of the pin through the securing key in the gimballed joint illustrated in FIG. 4.
Figure 7:
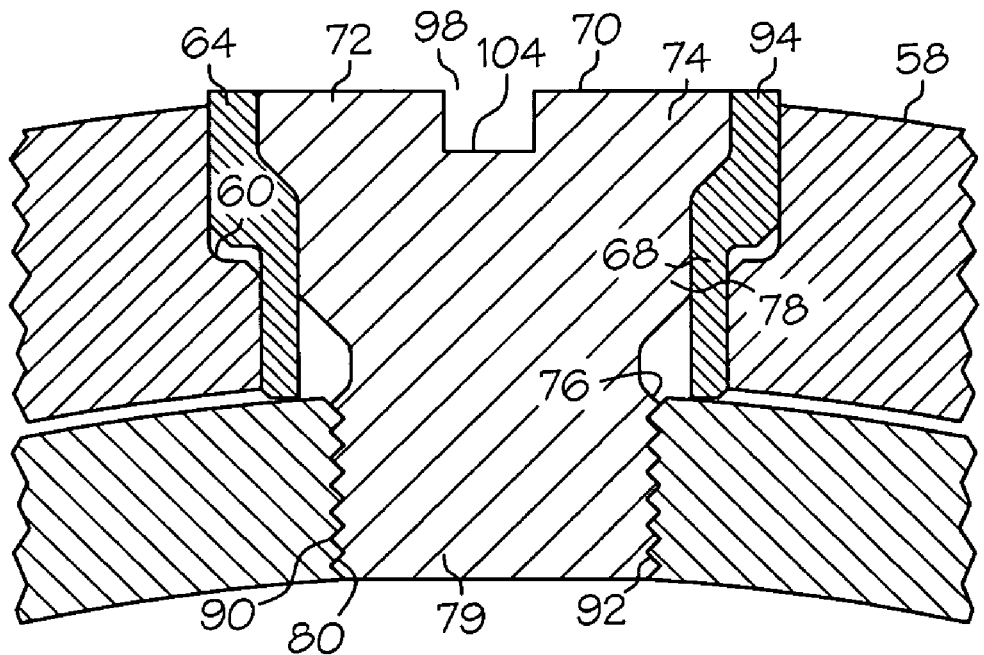
FIG. 7 is a cross-sectional view illustration of the pin transverse to the view illustrated in FIG. 6.

Additionally referring to FIG. 5, internally threaded holes 80 are disposed through the first and second forward lugs 36 and 38 and through the first and second aft lugs 46 and 48. A ring 58 is circumscribed about or surrounds the first and second forward lugs 36 and 38 and the first and second aft lugs 46 and 48. Four counterbored holes 60 are disposed through the ring 58 at 90 degree intervals around the ring. Referring to FIGS. 5, 6, and 7, each of the counterbored holes 60 has a wide radially outer section 64 and a narrow radially inner section 68 and each of the counterbored holes 60 is aligned with one of the internally threaded holes 80.

Referring to FIGS. 2, 5, 6, and 7, four pins 70 having heads 72 with shanks 76 extending inwardly therefrom are disposed through the counterbored holes 60. Each of the heads 72 includes a relatively wide outer section 74 disposed in each corresponding ones of the wide radially outer sections 64 of the four counterbored holes 60 and a relatively narrow inner section 78 disposed in each corresponding ones of the narrow radially inner sections 68 of the four counterbored holes 60. Externally threaded portions 79 of the shanks 76 are threaded into the internally threaded holes 80 in the each of the first and second forward lugs 36 and 38 and the first and second aft lugs 46 and 48. The pins 70 are threaded into the thick lugs which secure the ring 58 to the lugs. This both retains the pins thus preventing them from falling out of the ring, and prevents each lug from bending radially inwardly and causing one or more of the pins to release under high pressures. Placing the internally threaded holes 80 in the first and second forward lugs 36 and 38 and the first and second aft lugs 46 and 48 allows the pins 70 to be assembled from the outside of the ring 58 as a final assembly operation. This allows the bellows 14 to be large enough to create a full port, or high flow joint. The bellows must be compressed, for pre-compression, during assembly and then the pins are installed.

Figure 2:
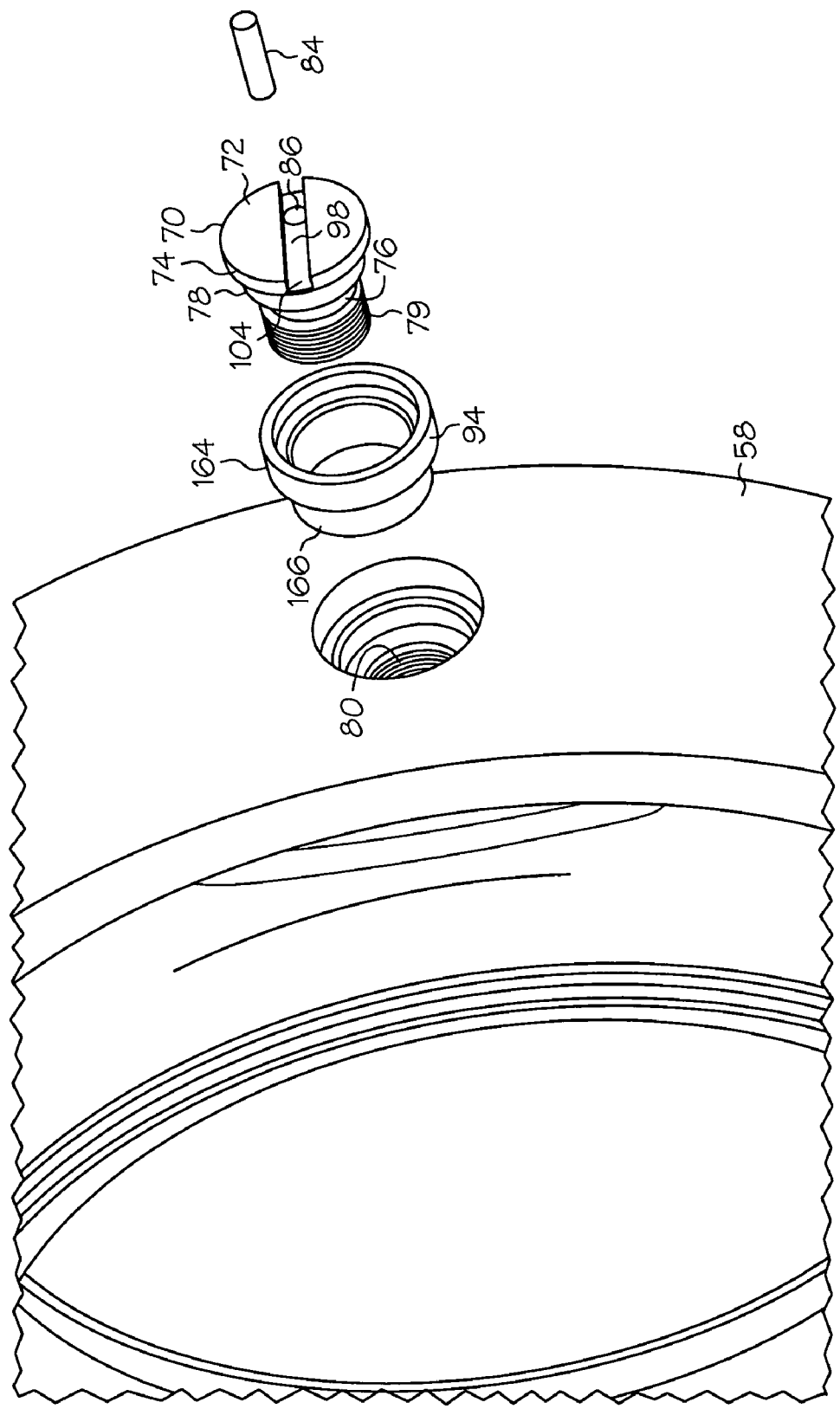
FIG. 2 is a perspective partially exploded view illustration of a pin, sleeve, and securing key of the gimballed joint illustrated in FIG. 1.
Figure 4:
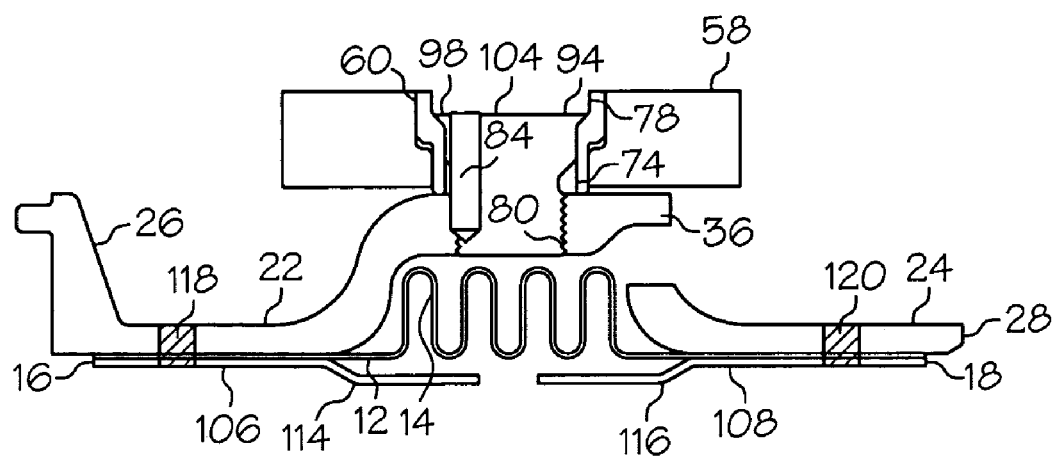
FIG. 4 is a circumferential cross-sectional view illustration of the gimballed joint illustrated in FIG. 1 taken through the pins in the gimballed joint.
Figure 4:
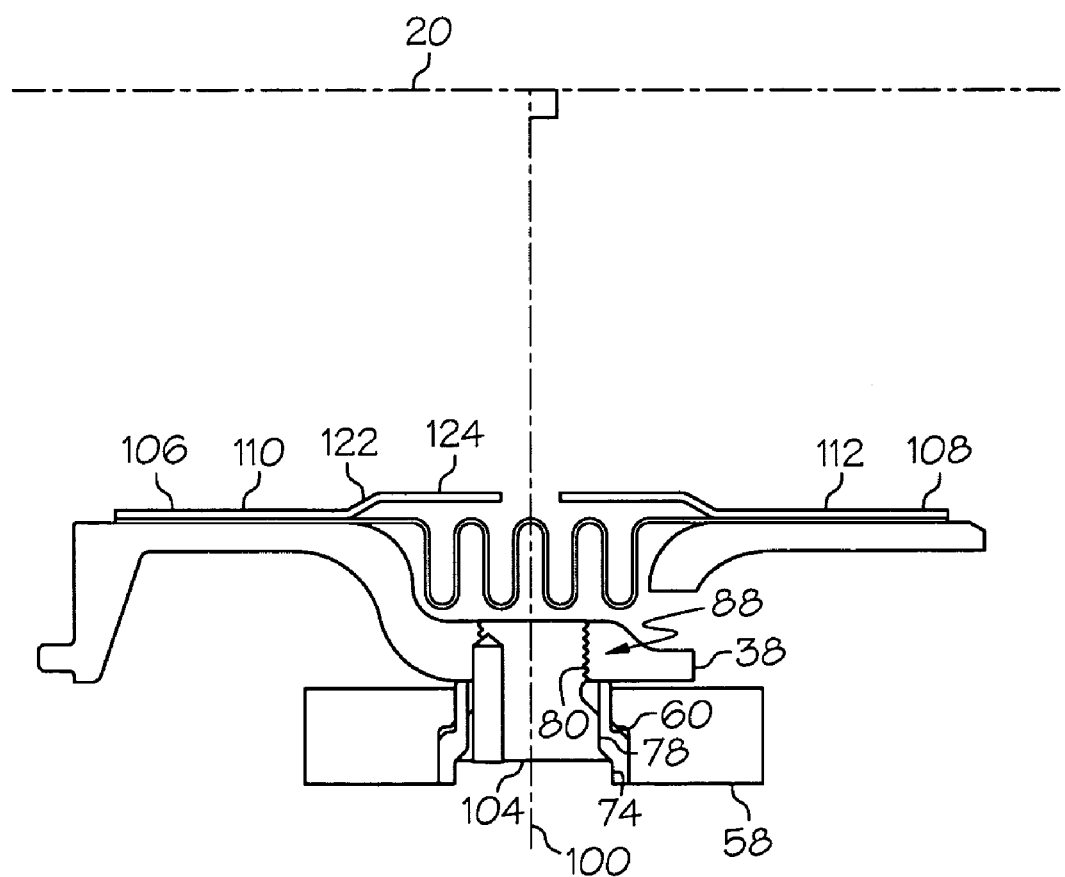
Figure 8:
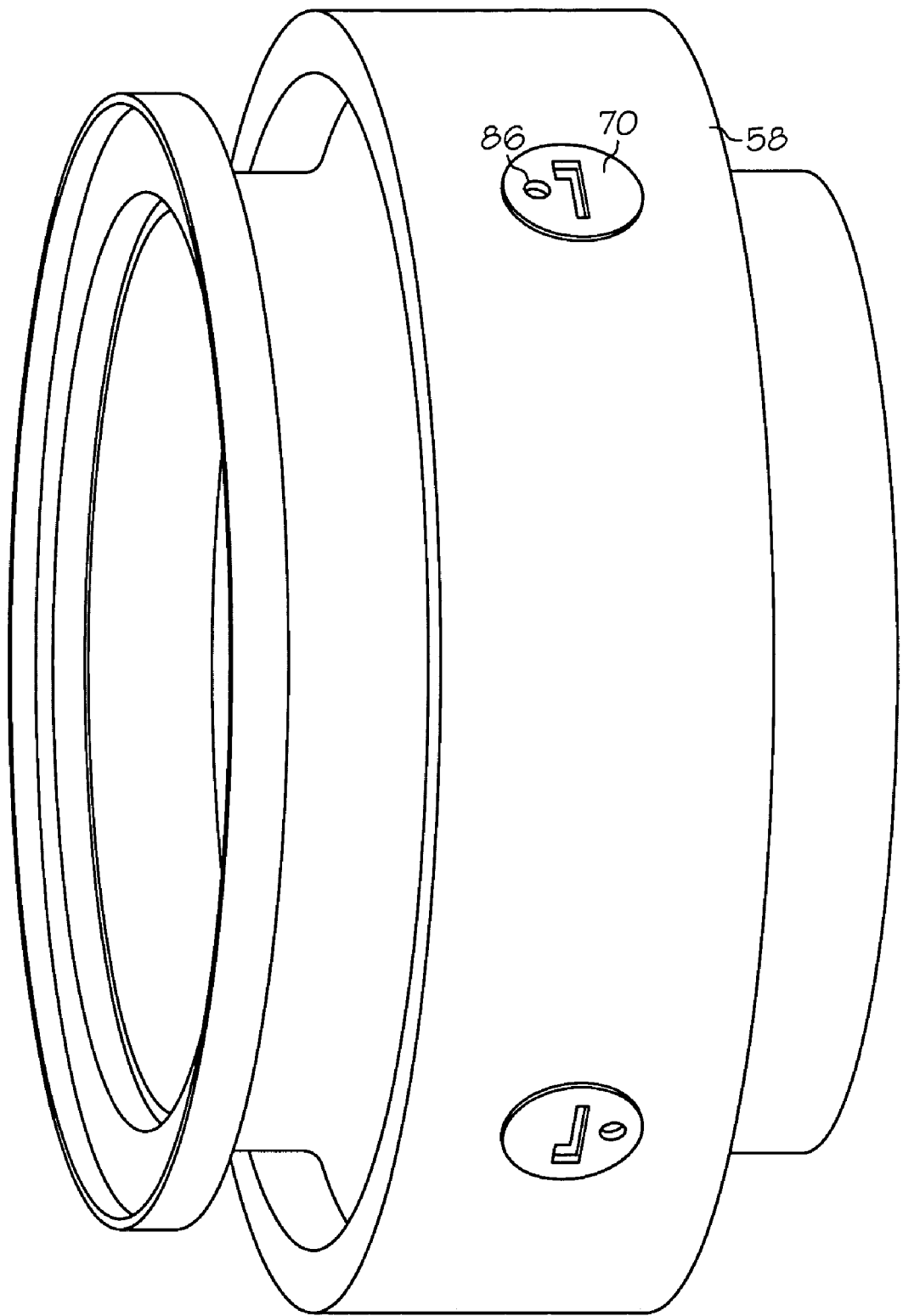
FIG. 8 is a perspective view illustration of an alternative pin and securing key of an alternative gimballed joint full port externally gimballed joint.
Figure 9:
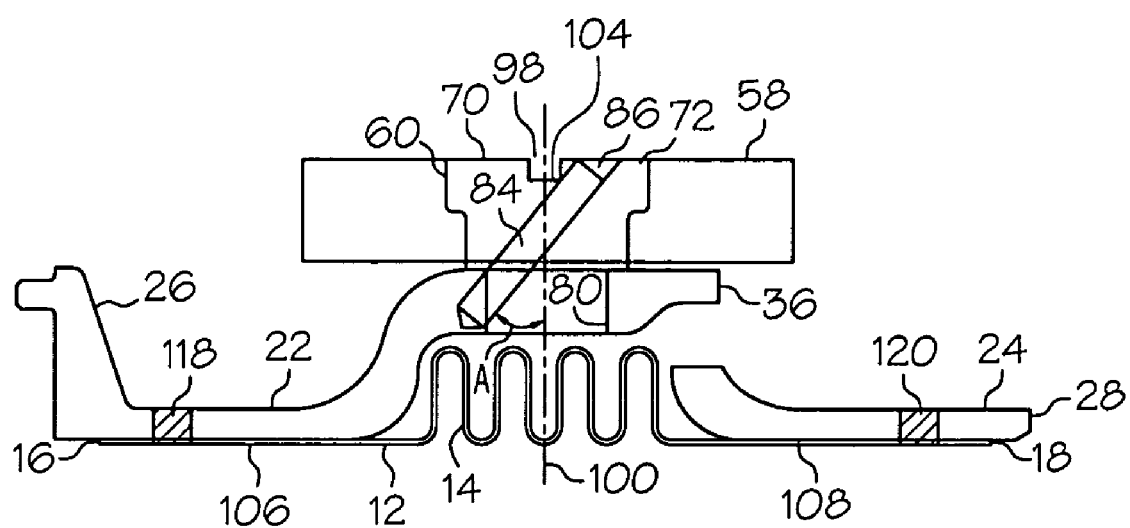
FIG. 9 is a cross-sectional view illustration of the alternative gimballed joint illustrated in FIG. 8 taken along an axis and through the pins of the gimballed joint.

The exemplary embodiment of the gimballed joint 10 further includes a key 84, illustrated in FIGS. 2, 4, and 6, disposed through a key hole 86 extending inwardly through each of the heads 72 and through threaded together portions 88 of external threads 90 of each of the externally threaded portions 79 and internal threads 92 of each the internally threaded holes 80. The pins 70 have pin centerlines 100 normal to the joint centerline 20 and the key holes 86 and the keys 84 are disposed parallel to the pin centerline 100 through each of the heads 72 and the threaded together portions 88. In one alternative embodiment, illustrated in FIGS. 8 and 9, the key holes 86 and the keys 84 are disposed at an acute angle A to the pin centerline 100.

After a pin 70 is threaded into position, a pre-drilled hole which is a portion of the key hole 86 in the top of the pin is re-drilled deeper to extend into the threaded together portions 88 of the external threads 90 and the internal threads 92 to form the entire key hole 86. The key is placed in the key hole and welded to the top of the pin. The external threads 90 of the pins 70 are jammed against the internal threads 92 of the internally threaded holes 80 in the lugs and the pins can't back out.

The exemplary embodiment of the gimballed joint 10 illustrated in FIGS. 1–7, includes a wear bushing 94, also referred to as a wear sleeve, disposed in each of the four counterbored holes 60 between each of the heads 72 and the ring 58. The wear bushings 94 are stepped and generally conform to a space between the counterbored holes 60 and the heads 72 and, thus, also have wide radially outer sections 164 relatively narrow inner sections 166. Each wear bushing 94 is lightly pressed to each pin shank 76 to eliminate relative movement. The press fit of the wear bushing 94 on the pin shank 76 results in all wear occurring between the bushings and the ring holes 60. A driving slot 98 is located in each of the heads 72. The key holes 86 and the keys 84 extend inwardly through the heads 72 from bottoms 104 of the driving slots heads 72 and the keys 84 are welded to the heads 72. The wear bushings 94 are made from a material including Cobalt such as L-605 which is a harder material than what the pins 70 are made of. This reduces wear against bearing surfaces of the ring 58 which typically is made from a nickel alloy such as Inconel 718. The stepped shape of the wear bushings 94 prevents the pins from being pulled through the ring at high pressure conditions and allows for easier thread engagement at assembly.

Referring to FIGS. 1, 3, and 4, the exemplary embodiment of the gimballed joint 10 further includes annular forward and aft liners 106 and 108 having forward and aft cylindrical liner sections 110 and 112 are disposed within the forward and aft shroud annular sections 22 and 24 of the forward and aft shrouds 26 and 28, respectively. The annular bellows seal 12 with the bellows 14 between the forward and aft cylindrical seal sections 16 and 18 is radially disposed between the annular forward and aft liners 106 and 108 and the forward and aft shrouds 26 and 28, respectively.

Annular forward and aft extensions 114 and 116 depend radially inwardly from the forward and aft liners 106 and 108, respectively. The forward and aft extensions 114 and 116 include conical web portions 122 leading to cylindrical portions 124. Annular bonds such, illustrated herein as forward and aft seam welds 118 and 120, bond together the forward and aft cylindrical liner sections 110 and 112, the aft shroud annular sections, and the forward and aft cylindrical seal sections 16 and 18 therebetween. The first and second forward lugs 36 and 38 and the first and second aft lugs 46 and 48 extend axially away from and radially outwardly of the forward and aft shroud annular sections 22 and 24, respectively. The bellows 14 is disposed radially between the lugs 36, 38, 46, and 48 and the conical web 122 and cylindrical portions 124 of the forward and aft extensions 114 and 116.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

While the preferred embodiment of our invention has been described fully in order to explain its principles, it is understood that various modifications or alterations may be made to the preferred embodiment without departing from the scope of the invention as set forth in the appended claims.

What is claimed is:

1. A gimballed joint comprising:
   an annular bellows seal circumscribed about a joint centerline and mounted within forward and aft shrouds,
   the forward and aft shrouds having clevises with lugs,
   a ring circumscribed about the lugs,
   pins securing the ring to the lugs of the clevises,
   the pins having heads and shanks extending inwardly therefrom, and
   externally threaded portions of the shanks threaded into internally threaded holes in each of the lugs of the forward shroud and the lugs of the aft shroud.

2. A gimballed joint as claimed in claim 1 further comprising:
   counterbored holes in the ring,
   each of the counterbored holes having a wide radially outer section and a narrow radially inner section,
   each of the counterbored holes being aligned with one of the threaded holes,
   each of the heads including a relatively wide outer section disposed in corresponding wide radially outer section of one of the counterbored holes and a relatively narrow inner section disposed in a corresponding narrow radially inner sections of one of the counterbored holes, and a key disposed through a key hole extending inwardly through each of the heads and through threaded together portions of external threads of each of the externally threaded portions and internal threads of each the internally threaded holes.

3. A gimballed joint as claimed in claim 2 further comprising a pin centerline of the pins normal to the joint centerline and each one of the keys disposed at an angle to a corresponding one of the pins centerlines.

4. A gimballed joint as claimed in claim 2 further comprising a wear bushing disposed in each of the four counterbored holes between each of the heads and the ring.

5. A gimballed joint as claimed in claim 4 further comprising a driving slot in each of the heads.

6. A gimballed joint as claimed in claim 5 wherein each one of the keys and each one of the key holes extend inwardly through each of the heads and through the threaded together portions of the external threads and the internal threads parallel to a corresponding one of the pins centerlines of the pins.

7. A gimballed joint as claimed in claim 6 wherein the key holes and the keys extend inwardly through the heads from bottoms of the driving slots.

8. A gimballed joint as claimed in claim 7 wherein the keys are welded to the heads.

9. A gimballed joint as claimed in claim 4 wherein the wear bushings are made from a material including Cobalt.

10. A gimballed joint as claimed in claim 9 wherein the ring is made from a nickel alloy.

11. A gimballed joint as claimed in claim 9 wherein the ring is made Inconel 718.

12. A gimballed joint as claimed in claim 2 further comprising:
    annular forward and aft liners disposed within the annular bellows seal,
    the annular bellows seal radially disposed between the forward and aft shrouds and the annular forward and aft liners, and
    annular forward and aft seam welds sealing together the annular bellows seal, the forward and aft shrouds, and the annular forward and aft liners.

13. A gimballed joint as claimed in claim 12 further comprising a key disposed through a key hole extending inwardly through each of the heads and through threaded together portions of external threads of each of the externally threaded portions and internal threads of each the internally threaded holes.

14. A gimballed joint as claimed in claim 12 further comprising a pin centerline normal to the joint centerline and each one of the keys disposed at an angle to a corresponding one of the pin centerlinse through each of the heads and the threaded together portions.

15. A gimballed joint as claimed in claim 12 further comprising a wear bushing disposed in each of the counterbored holes between each of the heads and the ring.

16. A gimballed joint as claimed in claim 15 further comprising a key disposed through a key hole extending inwardly through each of the heads and through threaded together portions of external threads of each of the externally threaded portions and internal threads of each the internally threaded holes.

17. A gimballed joint as claimed in claim 16 further comprising a driving slot in each of the heads.

18. A gimballed joint as claimed in claim 17 wherein the keys and the key holes extend inwardly through each of the heads and through the threaded together portions of the external threads and the internal threads parallel to a pin centerline of each of the pins.

19. A gimballed joint as claimed in claim 18 wherein the key holes and the keys extend inwardly through the heads from bottoms of the driving slots.

20. A gimballed joint as claimed in claim 19 wherein the keys are welded to the heads.

21. A gimballed joint as claimed in claim 15 wherein the wear bushings are made from a material including Cobalt.

22. A gimballed joint as claimed in claim 21 wherein the ring is made from a nickel alloy.

23. A gimballed joint as claimed in claim 21 wherein the ring is made Inconel 718.

24. A gimballed joint comprising:
    an annular bellows seal having a bellows between forward and aft cylindrical seal sections and circumscribed about a joint centerline,
    the forward and aft cylindrical seal sections mounted within and to forward and aft shroud annular sections, respectively, of forward and aft shrouds,
    the forward and aft shrouds having forward and aft clevises, respectively,
    the forward clevis having first and second forward lugs spaced 180 degrees apart around a forward periphery of the forward shroud annular section,
    the aft clevis having first and second aft lugs spaced 180 degrees apart around an aft periphery of the aft shroud annular section,
    an internally threaded hole disposed through each of the first and second forward lugs and each of the first and second aft lugs,
    a ring circumscribed about the first and second forward lugs and the first and second aft lugs,
    four counterbored holes in the ring,
    each of the counterbored holes having a wide radially outer section and a narrow radially inner section and each of the counterbored holes aligned with one of the threaded holes,
    four pins having heads and shanks extending inwardly therefrom,
    each of the heads including a relatively wide outer section disposed in a corresponding wide radially outer section of one of the four counterbored holes and a relatively narrow inner section disposed in a corresponding narrow radially inner section of one of the four counterbored holes, and
    externally threaded portions of the shanks threaded into internally threaded holes in the each of the first and second forward lugs and the first and second aft lugs.

25. A gimballed joint as claimed in claim 24 further comprising a key disposed through a key hole extending inwardly through each of the heads and through threaded together portions of external threads of each of the externally threaded portions and internal threads of each the internally threaded holes.

26. A gimballed joint as claimed in claim 25 further comprising a pin centerline normal to the joint centerline and each one of the keys disposed at an angle to a corresponding one of the pin centerlines.

27. A gimballed joint as claimed in claim 24 further comprising a wear bushing disposed in each of the four counterbored holes between each of the heads and the ring.

28. A gimballed joint as claimed in claim 27 further comprising a key disposed through a key hole extending inwardly through each of the heads and through threaded together portions of external threads of each of the externally threaded portions and internal threads of each the internally threaded holes.

29. A gimballed joint as claimed in claim 28 further comprising a driving slot in each of the heads.

30. A gimballed joint as claimed in claim 29 wherein each one of the keys and each one of the key holes extend inwardly through each of the heads and through the threaded together portions of the external threads and the internal threads parallel to a pin centerline of each of the four corresponding pins.

31. A gimballed joint as claimed in claim 30 wherein the key holes and the keys extend inwardly through the heads from bottoms of the driving slots.

32. A gimballed joint as claimed in claim 31 wherein the keys are welded to the heads.

33. A gimballed joint as claimed in claim 27 wherein the wear bushings are made from a material including Cobalt.

34. A gimballed joint as claimed in claim 33 wherein the ring is made from a nickel alloy.

35. A gimballed joint as claimed in claim 33 wherein the ring is made Inconel 718.

36. A gimballed joint comprising:
    annular forward and aft shrouds having forward and aft shroud annular sections respectively and circumscribed about a joint centerline,
    annular forward and aft liners having forward and aft cylindrical liner sections disposed within the forward and aft shroud annular sections respectively,
    an annular bellows seal having a bellows between forward and aft cylindrical seal sections disposed between the annular forward and aft liners and the forward and aft shrouds respectively,
    annular forward and aft extensions depending radially inwardly from the forward and aft liners respectively,
    annular forward and aft seals sealing together the forward and aft cylindrical liner sections, the forward and aft shroud annular sections, and the forward and aft cylindrical seal sections therebetween,
    the forward and aft shrouds, having forward and aft clevises respectively,
    first and second forward lugs spaced 180 degrees apart around a forward periphery of the forward shroud annular section,
    first and second aft lugs spaced 180 degrees apart around an aft periphery of the aft shroud annular section,
    the first and second forward lugs and the first and second aft lugs extending axially away from and radially outwardly of the forward and aft shroud annular sections respectively,
    the bellows disposed radially between the first and second forward lugs and the first and second aft lugs and the forward and aft extensions,
    an internally threaded hole disposed through each of the first and second forward lugs and through each of the first and second aft lugs,
    a ring circumscribed about the first and second forward lugs and the first and second aft lugs,
    four counterbored holes in the ring,
    each of the counterbored holes having a wide radially outer section and a narrow radially inner section and each of the counterbored holes aligned with one of the threaded holes,
    four pins having heads and shanks extending inwardly therefrom,
    each of the heads including a relatively wide outer section disposed in a corresponding wide radially outer section of one of the four counterbored holes and a relatively narrow inner section disposed in a corresponding narrow radially inner sections of one of the four counterbored holes, and
    externally threaded portions of the shanks threaded into internally threaded holes in the each of the first and second forward lugs and the first and second aft lugs.

37. A gimballed joint as claimed in claim 36 further comprising a key disposed through a key hole extending inwardly through each of the heads and through threaded together portions of external threads of each of the externally threaded portions and internal threads of each the internally threaded holes.

38. A gimballed joint as claimed in claim 37 further comprising a pin centerline normal to the joint centerline and each of the keys disposed at an angle to a corresponding one of the pin centerlines.

39. A gimballed joint as claimed in claim 36 further comprising a wear bushing disposed in each of the four counterbored holes between each of the heads and the ring.

40. A gimballed joint as claimed in claim 39 further comprising a key disposed through a key hole extending inwardly through each of the heads and through threaded together portions of external threads of each of the externally threaded portions and internal threads of each the internally threaded holes.

41. A gimballed joint as claimed in claim 40 further comprising a driving slot in each of the heads.

42. A gimballed joint as claimed in claim 41 wherein each one of the keys and each one of the key holes extend inwardly through each of the heads and through the threaded together portions of the external threads and the internal threads parallel to a corresponding centerline of each of the four pins.

43. A gimballed joint as claimed in claim 42 wherein the key holes and the keys extend inwardly through the heads from bottoms of the driving slots.

44. A gimballed joint as claimed in claim 43 wherein the keys are welded to the heads.

45. A gimballed joint as claimed in claim 39 wherein the wear bushings are made from a material including Cobalt.

46. A gimballed joint as claimed in claim 45 wherein the ring is made from a nickel alloy.

47. A gimballed joint as claimed in claim 45 wherein the ring is made Inconel 718.

48. A gimballed joint as claimed in claim 36 wherein the annular forward and aft seals are annular forward and aft seam welds.

49. A gimballed joint as claimed in claim 48 further comprising a key disposed through a key hole extending inwardly through each of the heads and through threaded together portions of external threads of each of the externally threaded portions and internal threads of each the internally threaded holes.

50. A gimballed joint as claimed in claim 49 further comprising a pin centerline normal to the joint centerline and the key disposed at an angle to a corresponding one of the pin centerlines.

51. A gimballed joint as claimed in claim 48 further comprising a wear bushing disposed in each of the four counterbored holes between each of the heads and the ring.

52. A gimballed joint as claimed in claim 51 further comprising a key disposed through a key hole extending inwardly through each of the heads and through threaded together portions of external threads of each of the externally threaded portions and internal threads of each the internally threaded holes.

53. A gimballed joint as claimed in claim 52 further comprising a driving slot in each of the heads.

54. A gimballed joint as claimed in claim 53 wherein each one of the keys and each one of the key holes extend inwardly through each of the heads and through the threaded together portions of the external threads and the internal threads parallel to a corresponding centerline of each of the four pins.

55. A gimballed joint as claimed in claim 54 wherein the key holes and the keys extend inwardly through the heads from bottoms of the driving slots.

56. A gimballed joint as claimed in claim 55 wherein the keys are welded to the heads.

57. A gimballed joint as claimed in claim 51 wherein the wear bushings are made from a material including Cobalt.

58. A gimballed joint as claimed in claim 51 wherein the ring is made from a nickel alloy.

59. A gimballed joint as claimed in claim 51 wherein the ring is made Inconel 718.

* * * * *